United States Patent [19]

Reitmeier

[11] Patent Number: 6,122,400

[45] Date of Patent: Sep. 19, 2000

[54] COMPRESSION ENCODER BIT ALLOCATION UTILIZING COLORMETRIC-ADAPTIVE WEIGHTING AS IN FLESH-TONE WEIGHTING

[75] Inventor: Glenn A. Reitmeier, Yardley, Pa.

[73] Assignee: Sarnoff Corporation, Princeton, N.J.

[21] Appl. No.: 09/001,619

[22] Filed: Dec. 31, 1997

Related U.S. Application Data

[60] Provisional application No. 60/060,112, Sep. 26, 1997.

[51] Int. Cl.$^7$ .................................. G06K 9/00; G06K 9/46

[52] U.S. Cl. ........................... 382/166; 382/239; 382/250

[58] Field of Search ..................................... 382/166, 239, 382/250; 345/153, 152; 348/716, 717, 417, 418, 607, 393, 649, 468; 358/539, 1.2

[56] References Cited

U.S. PATENT DOCUMENTS

| | | | |
|---|---|---|---|
| 5,323,187 | 6/1994 | Park | 348/405 |
| 5,488,429 | 1/1996 | Kojima et al. | 348/653 |
| 5,638,136 | 6/1997 | Kojima et al. | 348/653 |

OTHER PUBLICATIONS

Van Dyck et al. Subband/VQ Coding of Color Images with Perceptually Optimal Bit Allocation. IEEE Transactions on Circuits and Systems for Video Technology, vol. 4, No. 1. pp. 68–82, Feb. 1994.

Toyokura et al., A Video DSP with a Macroblock–Level–Pipeline and a SIMD Type Vector–Pipeline Architecture for MPEG2 CODEC, IEEE j. Solid–State Circ., vol. 29, No. 12, pp. 1474–1481, Dec. 1994.

PCT Search Report Feb. 3, 1999.

*Primary Examiner*—Jose L. Couso
*Assistant Examiner*—Shawn B. Cage
*Attorney, Agent, or Firm*—William J. Burke

[57] ABSTRACT

A method and concomitant apparatus that adaptively utilizes at least chrominance information to control bit allocation in an MPEG-like compression encoder. The invention controls bit allocation of a video signal by examining at least color difference (U, V) components within the video signal, identifying, illustratively, flesh-tone indicative portions of the color difference signals, and preferentially encoding those identified portions of the video signal by allocating additional bits to, e.g., macroblocks associated with the flesh-tone indicative portions of the signal.

24 Claims, 3 Drawing Sheets

COMPRESSION ENCODER BIT ALLOCATION UTILIZING COLORMETRIC-ADAPTIVE WEIGHTING AS IN FLESH-TONE WEIGHTING

The invention claims benefit of U.S. Provisional Application Number 60/060,112, filed Sep. 26, 1997 and incorporated herein by reference in its entirety.

The present invention relates to an apparatus and concomitant method for controlling the coding of motion video. More particularly, this invention relates to a method and apparatus for dynamically controlling the coding rate of a block-based video coding system in response to colormetric information within the video signal.

BACKGROUND OF THE INVENTION

The Moving Picture Experts Group (MPEG) created the ISO/IEC international Standards 11172 and 13818 (generally referred to as MPEG-1 and MPEG-2 format respectively) to establish a standard for coding/decoding strategies. Although these MPEG standards specify a general coding methodology and syntax for generating an MPEG compliant bitstream, many variations are permitted to accommodate a plurality of different applications and services such as desktop video publishing, video conferencing, digital storage media and television broadcast. A related video encoding standard is the "Draft ITU-T Recommendation H.263: Video Coding for Low Bitrate Communication" (December 1995), which has been promulgated by the International Telecommunications Union. The above standards are herein incorporated by reference in their respective entireties.

In the production and post-production of television and other video material, extreme care is taken to preserve color fidelity, especially to preserve accurate flesh tones. This includes special circuitry in studio cameras, and often special "hand tuning" by a colorist. With such a degree of care taken, it must be noted that the final compression encoding of such material is usually performed by a compression encoder "black box" in which, typically, bit allocation is performed based on a measure of "busy-ness" or texture detail information in each block of the image. That is, the compression encoder allocates more bits to areas of the picture that have more detail information. Since detail information is primarily included within the luminance portion of a television or video signal, scene detail analysis of such a signal is performed using the luminance portion of the television or video signal.

Unfortunately, compression encoders implementing luminance signal detail analysis tend to exhibit, e.g., flesh-tone related artifacts when portions of a television or video signal comprising flesh tones are not associated with a sufficiently "busy" luminance portion. That is, a picture may include a relatively "busy" portion, such that the "busy" portion is allocated an increased number of bits. The picture may also include a relatively non-busy portion that comprises flesh tone colors and other color or content information deemed to be perceptually important (such as advertising logo colors, professional graphics renderings and the like). These important chrominance portions are disadvantageously allocated a decreased number of bits to compensate for the increase in bit allocation to the "busy" portion of the picture. Thus, flesh-tone and other important chrominance aspects of a picture may be inaccurately displayed if within an area of the picture including low luminance detail.

Therefore, a need exists in the art for a high quality encoding apparatus and method that eliminates the above-described artifacts by performing a detail analysis that considers flesh-tone and/or other high value chrominance information.

SUMMARY OF THE INVENTION

The invention is a method and concomitant apparatus that adaptively utilizes at least chrominance information to control bit allocation in an MPEG-like compression encoder. The invention controls bit allocation of a video signal by examining at least color difference (U, V) components within the video signal, identifying, illustratively, flesh-tone indicative portions of the color difference signals, and preferentially encoding those identified portions of the video signal by allocating additional bits to macroblocks associated with the flesh-tone indicative portions of the signal.

Specifically, the invention comprises a method for controlling compression coding of a video signal, comprising the steps of extracting, from at least selected portions of the video signal, colormetric information; determining if the colormetric information is within a first colormetric range; and in response to the colormetric information being within the first colormetric range, increasing a bit allocation to the selected portions of the video signal associated with the first colormetiic range.

Another embodiment of the invention is an apparatus for preferential coding within a block-based coding system, comprising: a color analyzer, coupled to receive colormetric information associated with a macroblock being coded, for generating an output signal indicative of the presence of a preferred color or range of colors in the macroblock being coded; and a rate controller, coupled to the color analyzer, for preferentially increasing a bit allocation to macroblocks including the preferred color or range of colors.

In one embodiment of the invention, the first or preferred colormetric range comprises a flesh-tone indicative colormetric range. In another embodiment of the invention, the first or preferred colormetric range comprises highly saturated red or blue hues associated with luminance signals having low energy levels

BRIEF DESCRIPTION OF THE DRAWINGS

The teachings of the present invention can be readily understood by considering the following detailed description in conjunction with the accompanying drawings, in which:

FIG. 3B depicts an embodiment of a color analyzer suitable for use in the compression encoder of FIG. 2.

To facilitate understanding, identical reference numerals have been used, where possible, to designate identical elements that are common to the figures.

DETAILED DESCRIPTION

Although the present invention is described within the context of an MPEG compliant encoder, those skilled in the art will realize that the present invention can be adapted to other encoders that are compliant with other coding/decoding standards.

Figure 1:
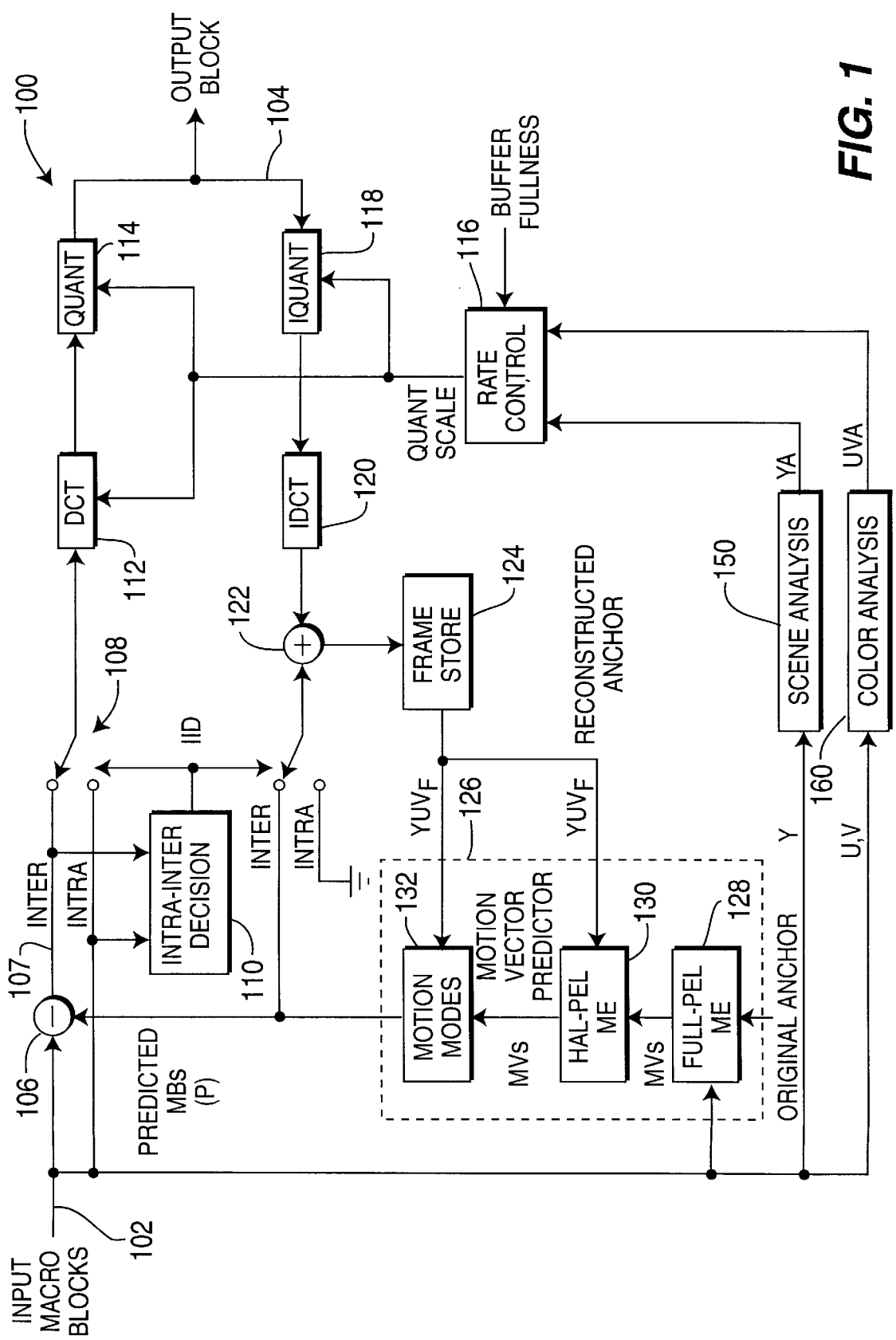
FIG. 1 depicts a high level block diagram of a block-based coding system (specifically, an MPEG encoder) incorporating an embodiment of the present invention.

FIG. 1 depicts a high level block diagram of a block-based coding system 100 (specifically, an MPEG encoder) incorporating the present invention. The input signal, at port 102, to the system is assumed to be a preprocessed image that has been partitioned into a plurality of blocks, where the blocks are sequentially provided as an input to the system. Under the MPEG standard, these blocks of pixels are commonly known as macroblocks, e.g., a 16×16 pixel block comprised of a collection of four 8×8 luminance blocks and two co-located 8×8 chrominance blocks. The following disclosure uses the MPEG standard terminology; however, it should be understood that the term macroblock is intended to describe a block of pixels of any size that is used for the basis of motion compensation.

The system 100 computes, from the input signal motion vectors and the stored reconstructed anchor frame, a series of predicted macroblocks (P). Each predicted macroblock is illustratively produced by decoding the output signal, at port 104, just as the receiver of the transmitted output signal would decode the received signal. Subtractor 106 generates, on path 107, a residual signal (also referred to in the art as simply the residual or the residual macroblock) by subtracting the predicted macroblock from the input macroblock.

If the predicted macroblock is substantially similar to the input macroblock, the residuals are relatively small and are easily coded using very few bits. In such a scenario, the macroblock will be encoded as a motion compensated macroblock, i.e., motion vector(s) and associated residual (s). However, if the difference between the predicted macroblock and the input macroblock is substantial, the residuals are difficult to code. Consequently, the system operates more efficiently by directly coding the input macroblock rather than coding the motion compensated residual macroblock. This selection is known as a selection of the coding mode. Coding the input macroblock (I) is referred to as intra-coding, while coding the residuals is referred to as inter-coding. The selection between these two modes is known as the Intra-Inter-Decision (IID).

The IID is made by the IID circuit 110, which sets the coding mode switch 108. The IID is typically computed by first computing the variance of the residual macroblock (Var R) and the variance of the input macroblock (Var I). The coding decision is based on these values. There are several functions that can be used to make this decision. For example, using the simplest function, if Var R is less than Var I, the IID selects the Inter-mode. Conversely, if Var I is less than Var R, the IID selects the Intra-mode.

The selected block is processed in a discrete cosine transform (DCT) block 112. The DCT produces coefficients representing the input signal to the DCT. A quantizer 114 quantizes the coefficients to produce the output block at port 104. A dynamic rate controller 116 controls the quantization scale (step size) used to quantize the coefficients. Optionally, the rate controller 116 also controls the number of DCT coefficients that are coded by the system.

The primary task of the dynamic rate controller 116 is to manage the fullness of a rate buffer from which a constant output bit rate is provided to a transmission channel. The constant bit rate must be maintained even though the encoding rate may vary significantly, depending on the content of each image and the sequence of images. Another important task of the dynamic rate controller 116 is to insure that the bit stream produced by the encoder does not overflow or underflow a decoder's input buffer. Overflow and underflow control is accomplished by maintaining and monitoring a virtual buffer within the encoder. This virtual buffer is known as the video buffering verifier (VBV). To ensure proper decoder input buffer bit control, the encoder's rate control process establishes for each picture, and also for each macroblock of pixels comprising each picture, a bit quota (also referred to herein as a bit budget). By coding the blocks and the overall picture using respective numbers of bits that are within the respective bit budgets, the VBV does not overflow or underflow. Since the VBV mirrors the operation of the decoder's input buffer, if the VBV does not underflow or overflow, then the decoder's input buffer will not underflow or overflow.

To accomplish such buffer control, the rate controller makes the standard assumption in video coding that the current picture looks somewhat similar to the previous picture. If this assumption is true, the blocks of pixels in the picture are motion compensated by the coding technique and, once compensated, require very few bits to encode. This method works very well, as long as the actual number of bits needed to code the picture is near the target number of bits assigned to the picture, i.e., that the number of bits actually used is within the bit quota for that picture.

A dynamic rate controller method and apparatus is disclosed in U.S. patent application Ser. No. 08/606.622, filed Feb. 26, 1996 for DYNAMIC CODING RATE CONTROL IN A BLOCK-BASED VIDEO CODING SYSTEM, and incorporated herein by reference in its entirety. A feature of the rate control method and apparatus disclosed in the above-incorporated application is the ability to detect "scene-cuts" and responsively adapt the rate control process to intra-code the macroblocks associated with the new scene.

To most accurately compute the residual, the encoder needs access to the decoded images. To accomplish such access, the quantizer 114 output is passed through both an inverse quantizer 118 and an inverse DCT 120. The output of the inverse DCT is ideally identical to the input to the DCT 112. In the inter-mode, the decoded macroblock is produced by summing the output of the inverse DCT and the predicted macroblock. During the intra-mode, the decoded macroblock is simply the output of the inverse DCT. The decoded macroblocks are then stored in a frame store 124. The frame store accumulates a plurality of these "reconstructed" macroblocks that constitute an entire reconstructed frame of image information. The motion vector predictor 126 uses the reconstructed frame as data for motion vectors that are used in generating predicted macroblocks for forthcoming input images.

To generate motion vectors, the motion vector predictor 126 comprises three components: a full-pel motion estimator 128, a half-pel motion estimator 130, and a motion mode block 132. The full-pel motion estimator 128 is a "coarse" motion vector generator that searches for a coarse match between a macroblock in a previous image and the present input macroblock. This course match is typically determined with respect to the luminance information components of the previous image and the present input macroblock. The previous image is referred to as an anchor image. Under the MPEG standards, the anchor image is what is known as an I or P frame within an image sequence known as a Group Of Pictures (GOP). The motion vector is a vector representing the relative position where a coarse match was found between the two macroblocks. The coarse motion vector generator 128 produces a motion vector that is accurate to one picture element (pel).

The accuracy of the full-pel motion estimator 128 is improved in the half-pel motion estimator 130. The half-pel estimator 130 uses the full-pel motion vectors and the reconstructed macroblocks from the frame store 124 to compute motion vectors to half-pel accuracy. The half-pel motion vectors are then sent to the motion modes block 132. Depending on the frame type (i.e., I, P or B), there may be multiple motion vectors related to each macroblock. I-frame or intra-coded macroblocks do not utilize any prediction, P-frame or forward predicted macroblocks are associated with respective forward predicted motion vectors and residuals, while B-frame or backward predicted macroblocks are associated with both forward and backward predicted motion vectors and residuals. The modes block 132 selects the best motion vector for representing motion for each input macroblock.

The concepts of Motion Estimation and Motion Compensation are based on an underlying assumption that the current picture is not very different from a previously occurring picture (the anchor image). However, when, e.g., a substantial scene change occurs, the anchor pictures are substantially different from the current picture. Hence, the predicted macroblocks are very inaccurate and the residuals are large. As such, for most input macroblocks of a picture, the IID selects the input macroblock (intra-mode) for coding in lieu of coding the residuals (inter-mode).

Since the intra-mode of coding a macroblock typically requires a larger portion of the "bit budget" than the inter-coding of the macroblock, it is desirable that the motion estimation circuitry or software provides accurately predicted macroblocks having relatively small residuals. For example, a method for utilizing both chrominance and luminance information in optimally calculating the motion estimation of a macroblock is described in U.S. patent application Ser. No. 09/002,295, filed simultaneously herewith (Attorney Docket 12660), and incorporated herein by reference in its entirety.

The block-based coding system 100 of FIG. 1 includes a scene analyzer 150 and a color analyzer 160. The scene analyzer 150 and color analyzer 160 are used to provide content-related information to the rate controller 116 so that the rate controller may increase (or decrease) the fidelity (i.e., bit allocation) of a macroblock or group of macroblocks associated with preferred content-related information. The rate controller 116 responds to a feedback signal BUFFER FULLNESS that provides an indication of the utilization of a rate buffer (not shown). As the rate buffer fills beyond, e.g., an appropriate upper utilization level, and the feedback signal BUFFER FULLNESS indicates that the buffer is filling up, the rate controller 116 will encode macroblocks using fewer bits in order to avoid overflowing the rate buffer. Conversely, when the rate buffer empties below, e.g., an appropriate lower utilization level, and the feedback signal BUFFER FULLNESS indicates that the buffer is too low, more bits can be used to preserve more image fidelity and keep the buffer at a proper buffer utilization level.

The scene analyzer 150 analyzes, on a macroblock-by-macroblock basis, the luminance information of the input macroblocks within the input signal provided at port 102. Specifically, the scene analyzer 150 analyzes the high frequency content of the macroblocks to determine a "busyness" or texture parameter of the luminance information within the macroblock. The scene analyzer generates an output signal YA indicative of the high frequency content analysis of each macroblock. The output signal YA is coupled to the rate controller 116, which responsively adapts a portion of the bit budget to provide, if possible, additional bits to those macroblocks exhibiting high frequency content exceeding, e.g., a threshold level.

The color analyzer 160 analyzes, on a macroblock-by-macroblock basis, the chrominance information of the input macroblocks within the input signal provided at port 102. Specifically, the color analyzer 160 analyzes the chrominance content of the macroblocks to determine if a preferred color or range of colors is present in the macroblock. The color analyzer 160 generates an output signal UVA indicative of the presence of the preferred color (or color rage) in each macroblock. The output signal UVA is coupled to the rate controller 116, which responsively adapts a portion of the bit budget to provide, if possible, additional bits to those macroblocks including the preferred color (or color rage) exceeding, e.g., a threshold level.

The preferred color or range of colors may comprise those colors (or ranges of colors) known to be associated with, illustratively, flesh tones. It must be noted that the same approach may be used for any particular hue that is to be preserved with increased fidelity. For example, MPEG encoders typically exhibit noise encoding highly saturated reds and/or blues. Thus, highly saturated reds and/or blues may be identified by color analyzer 160. The preferred color or range of colors may be predetermined (e.g., flesh tones) or adapted in a manual or automatic method to changing encoding needs.

A particular color or range of colors is associated with a particular vector angle or range of vector angles within U-V space. Therefore, the particular color or range of colors may be identified within a video signal by monitoring the vector angles within U-V space.

One method for identifying desired vector angles is to posit a rectangular region in the U-V color difference signal space that is associated with the desired vector angles. The rectangular region is defined by respective U and V vectors having respective upper and lower threshold levels. That is, the rectangular region is defined by respective U and V ranges. When the U and V vectors are both within their respective ranges, the desired vector angles and, hence, the desired color or range of colors is present in the monitored video signal.

Another method for identifying desired vector angles is to posit a pie wedge-shaped region within the color difference signal space described by a hue-saturation polar coordinate transformation of the U-V vectors. Using this method, hue-saturation threshold levels or ranges may be utilized to identify a desired color or range of colors within a video signal.

Figure 3A:
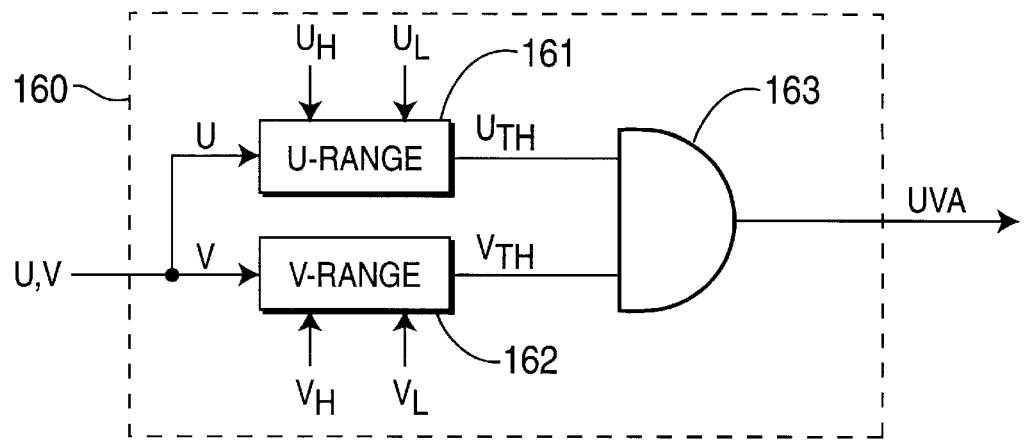
FIG. 3B depicts an embodiment of a color analyzer suitable for use in the compression encoder of FIG. 1.
FIG. 3C depicts another embodiment of a color analyzer suitable for use in the compression encoder of FIG. 1.

FIG. 3A depicts an embodiment of a color analyzer 160 suitable for use in the compression encoder 100 of FIG. 1. The color analyzer 160 of FIG. 3A implements the above-described rectangular coordinate color identification method. Specifically, the color analyzer 160 of FIG. 3A comprises a first range comparator 161, a second range comparator 162, and a logical AND gate 163.

First range comparator 161 receives a first chrominance component U of an input macroblock and compares the magnitude of the first chrominance component U to an upper level, selectable by a control signal $U_H$, and a lower limit, selectable by a control signal $U_L$. If the first chrominance component U of the input macroblock is within the range delineated by the two control signals, $U_H$ and $U_L$, an output control signal $U_{TH}$ of the first range comparator 161 is set high. Otherwise, the output control signal $U_{TH}$ is set low.

Second range comparator 162 receives a second chrominance component V of an input macroblock and compares the magnitude of the second chrominance component V to an upper level, selectable by a control signal $V_H$, and a lower limit, selectable by a control signal $V_L$. If the second chrominance component V of the input macroblock is within the range delineated by the two control signals, $V_H$ and $V_L$, an output control signal $V_{TH}$ of the second range comparator 161 is set high. Otherwise, the output control signal $V_{TH}$ is set low.

AND gate 163 receives the output signals $U_{TH}$ and $V_{TH}$ from, respectively, the first range comparator 161 and the second range comparator 162. When both output signals $U_{TH}$ and $V_{TH}$ are set high, an output UVA of the AND gate 163 is set high. If either of the output signals $U_{TH}$ and $V_{TH}$ are set low, the output of the AND gate 163 is set low.

The output signal UVA of AND gate 163 represents the state where the first chrominance component U is within a first range controlled by the $U_H$ and $U_L$ threshold control signals; and the second chrominance component V is within a second range controlled by the $V_H$ and $V_L$ threshold control signals. Thus, by setting the respective ranges to the preferred color or color rage, the output signal UVA of the AND gate 163 indicates that the preferred color or color range is present in the input macroblock.

Figure 3B:
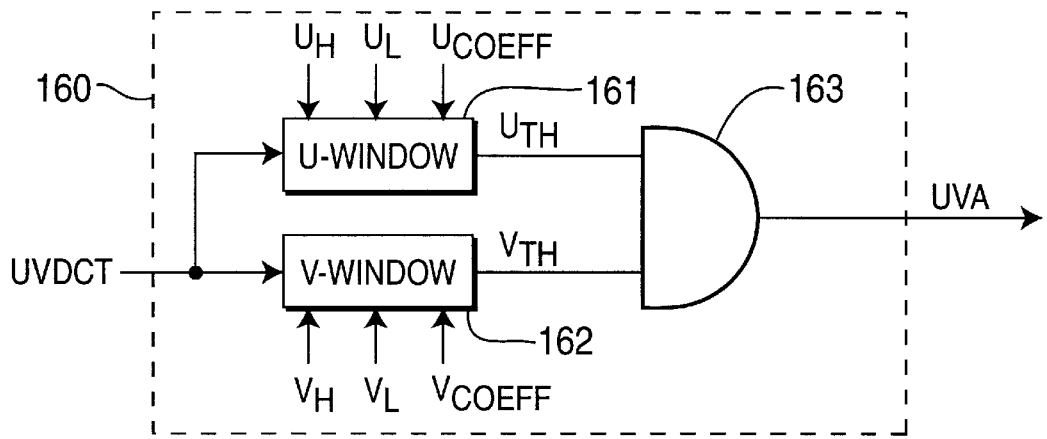
Figure 3C:
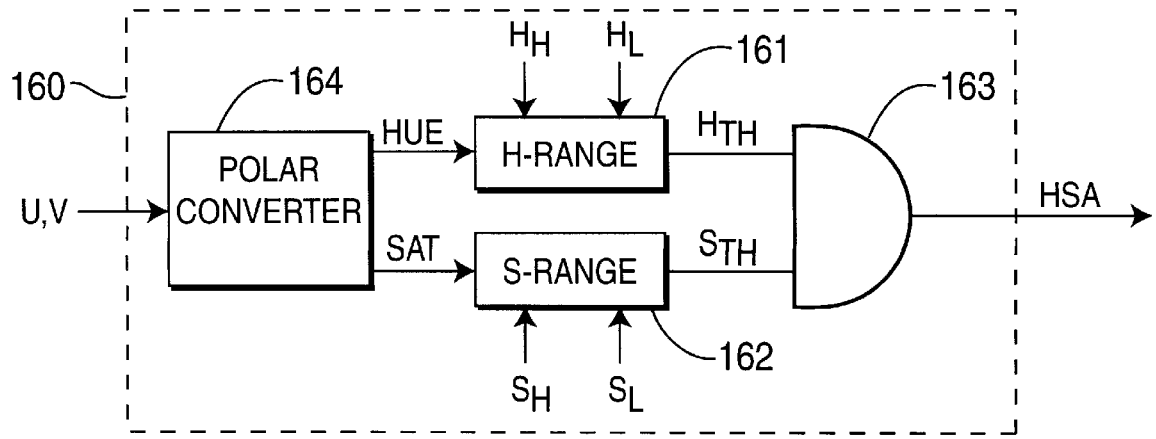

FIG. 3C depicts another embodiment of a color analyzer 160 suitable for use in the compression encoder 100 of FIG. 1. The color analyzer 160 of FIG. 3A implements the above-described polar coordinate color identification method. Specifically, the color analyzer 160 of FIG. 3C comprises a polar converter 164, a first range comparator 161, a second range comparator 162, and a logical AND gate 163.

Polar converter 164 receives and converts first and second chrominance components (U, V) of an input macroblock to hue (H) and saturation (S) values in a known manner. The hue (H) and saturation (S) values provide a polar coordinate system representation of the chrominance of the input macroblock. The first and second chrominance components (U, V) provide a rectangular coordinate system representation of the chrominance of the input macroblock.

First range comparator 161 receives the hue component HUE of the input macroblock and compares the magnitude of the hue component HUE to an upper level, selectable by a control signal $H_H$, and a lower limit, selectable by a control signal $H_L$. If the hue component HUE of the input macroblock is within the range delineated by the two control signals, $H_H$ and $H_L$, an output control signal $H_{TH}$ of the first range comparator 161 is set high. Otherwise, the output control signal $H_{TH}$ is set low.

Second range comparator 162 the saturation component SAT of the input macroblock and compares the magnitude of the saturation component SAT to an upper level, selectable by a control signal $S_H$, and a lower limit, selectable by a control signal $S_L$. If the saturation component SAT of the input macroblock is within the range delineated by the two control signals, $S_H$ and $S_L$, an output control signal $S_{TH}$ of the second range comparator 161 is set high. Otherwise, the output control signal $S_{TH}$ is set low.

AND gate 163 receives the output signals $S_{TH}$ and $S_{TH}$ from, respectively, the first range comparator 161 and the second range comparator 162. When both output signals $S_{TH}$ and $S_{TH}$ are set high, an output HSA of the AND gate 163 is set high. If either of the output signals $H_{TH}$ and $S_{TH}$ are set low, the output of the AND gate 163 is set low.

The output signal HSA of AND gate 163 represents the state where the hue component HUE is within a first range controlled by the $H_H$ and $H_L$ threshold control signals; and the saturation component SAT is within a second range controlled by the $S_H$ and $S_L$ threshold control signals. Thus, by setting the respective ranges to the preferred color or color rage, the output signal HSA of the AND gate 163 indicates that the preferred color or color range is present in the input macroblock.

Figure 2:
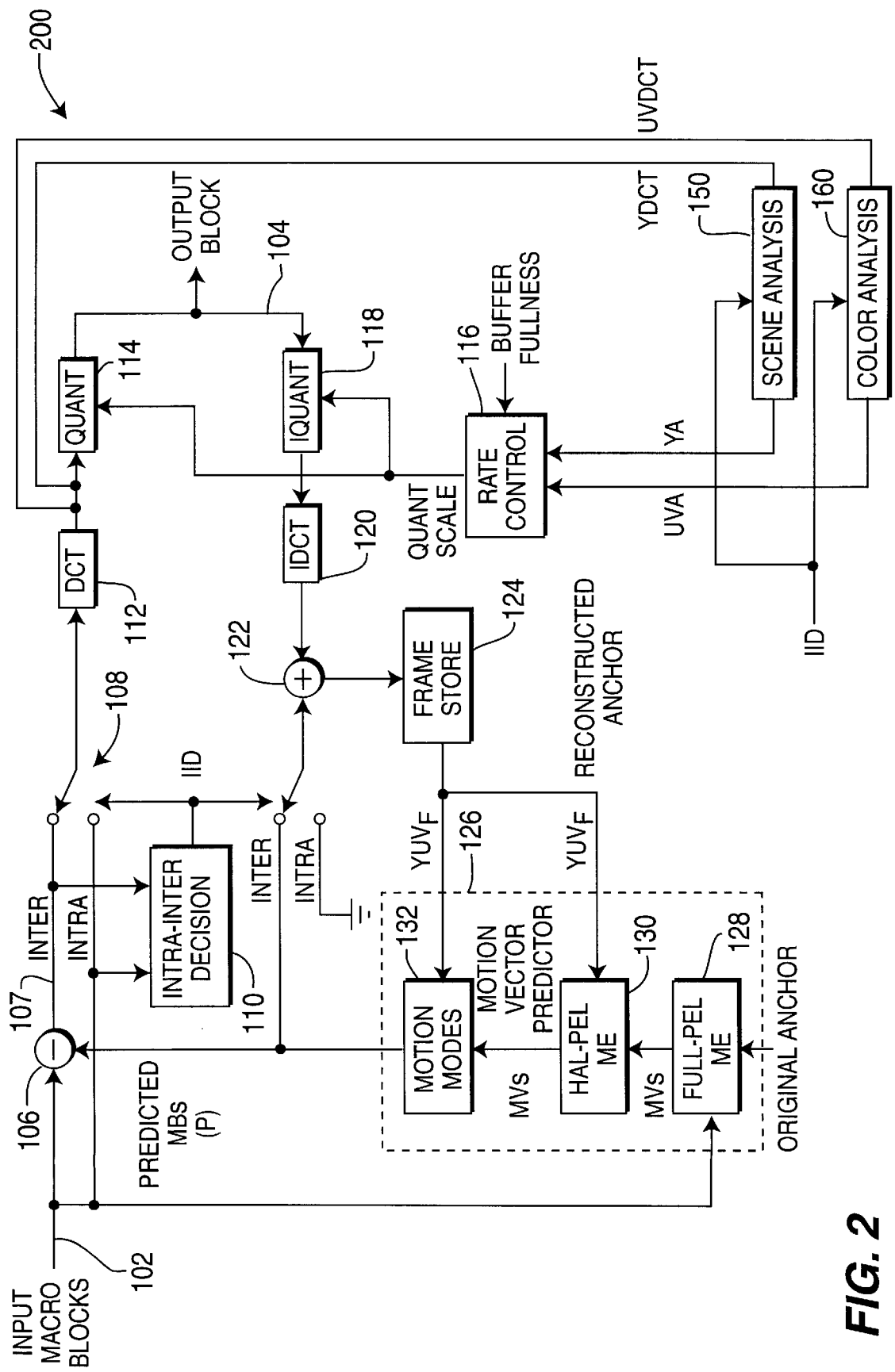
FIG. 2 depicts a block diagram of a block-based coding system incorporating an embodiment of the present invention.

FIG. 2 depicts a block diagram of a block-based coding system 200 incorporating an embodiment of the present invention. The block-based coding system 200 of FIG. 2 operates in substantially the same manner as the block-based coding system 100 of FIG. 1. As such, only the differences between the two systems 100 and 200 will discussed in detail. Specifically, the scene analyzer 150 and color analyzer 160 of the block-based coding system 200 of FIG. 2 are responsive to, respectively, luminance-related and chrominance-related discrete cosine transfer coefficients of macroblocks processed by DCT circuit 112.

The distribution of luminance-related DCT coefficients in an intra-coded macroblock provides an indication of the busy-ness of the macroblock. Specifically, the presence of high energy, high-order DCT coefficients is an indicator of "busy-ness" or texture. Likewise, the distribution of chrominance-related low order DCT coefficients (or even just the DC coefficient) in an intra-coded macroblock provides an indication of the colors within the macroblock. Thus, in the case of I-frames or intra-coded macroblocks, DCT analysis reduces the computation of busy-ness or color content to a simple threshold comparison that may be performed by, e.g., a microprocessor implementing a rate control algorithm. Since these techniques are only useful for intra-coded macroblocks, the mode decision indicator signal IID is coupled from the IID circuit 110 to both the scene analyzer 150 and the color analyzer 160 in the embodiment of FIG. 2. Scene analyzer 150 and color analyzer 160, in response to the mode decision indicator signal IID, are enabled in the case of an intra-coded macroblock and disabled in the case of a non-intra-coded macroblock.

FIG. 3B depicts an embodiment of a color analyzer 160 suitable for use in the compression encoder 200 of FIG. 2. The color analyzer 160 of FIG. 3B operates in substantially the same manner as the color analyzer 160. As such, only difference between the two embodiments will be discussed. Specifically, the color analyzer 160 of FIG. 3B utilizes chrominance-related discrete cosine transfer coefficients.

The first and second range comparators 161 and 162 each receive an additional control signal ($U_{COEFF}$ and $V_{COEFF}$) that is used to determine the number of DCT coefficients to be compared. That is, in response to the respective control signals $U_{COEFF}$ and $V_{COEFF}$ indicating that only the DC coefficients are to be utilized, only DC coefficients of the input chrominance-related DCT coefficients will be compared to the range threshold levels. Moreover, the range threshold levels for the embodiment of FIG. 3B include DCT coefficient information suitable for use in the range comparison process.

The above-described embodiments of the invention advantageously provide high quality compression encoding by enhancing those macroblocks or frames including preferred colors or color ranges. In this manner, post-production television or video processing functions may be performed in a more automated manner, since the critical color balancing and/or flesh tone enhancing functions are used to adapt the compression coding of the video signal.

Although various embodiments which incorporate the teachings of the present invention have been shown and described in detail herein, those skilled in the art can readily devise many other varied embodiments that still incorporate these teachings.

What is claimed is:

1. Method for controlling compression coding of a video signal, comprising the steps of:
   extracting, from at least selected portions of said video signal, colormetric information;
   determining if said colormetric information is within a first colormetric range; and
   in response to said colormetric information being within a first colormetric range, increasing a bit allocation to said selected portions of said video signal associated with said first colormetric range, wherein said step of extracting comprises the steps of:
      converting, from rectangular coordinate representations to polar coordinate representations, first and second chrominance components of said video signal;
      comparing said converted first chrominance component of said video signal to a first range having a first upper threshold level and a first lower threshold level; and
      comparing said converted second chrominance component of said video signal to a second range having a second upper threshold level and a second lower threshold level.

2. The method of claim 1, wherein said step of determining comprises the step of determining if said converted first and second chrominance components of said video signal are within said respective first and second ranges.

3. Apparatus for preferential coding within a block-based coding system, comprising:
   a color analyzer, coupled to receive colormetric information associated with a macroblock being coded, for generating an output signal indicative of the presence of a preferred color or range of colors in said macroblock being coded; and
   a rate controller, coupled to said color analyzer, for preferentially increasing a bit allocation to macroblocks including said preferred color or range of colors.

4. The apparatus of claim 3, further comprising:
   a scene analyzer, coupled to receive luminance information associated with said macroblock being coded, for generating an output signal indicative of the high frequency luminance content of said macroblock being coded; and wherein
   said rate controller being coupled to said scene analyzer and preferentially increasing said bit allocation to macroblocks including high frequency luminance content above a threshold level.

5. The apparatus of claim 3, wherein said color analyzer comprises:
   a first range comparator, for generating a first output signal indicative of the presence, in said macroblock being coded, of first chrominance components between a first upper threshold level and a first lower threshold level; and
   a second range comparator, for generating a second output signal indicative of the presence, in said macroblock being coded, of second chrominance components between a second upper threshold level and a second lower threshold level; and
   a logical processor, coupled to said first and second comparators, for logically processing said first and second output signals to produce a resultant signal suitable for use by said rate controller.

6. The apparatus of claim 5, wherein said decision processor comprises an AND gate.

7. The apparatus of claim 5, wherein said first and second chrominance component threshold levels are selected to produce a resultant signal indicative of the presence of flesh tone colors in said macroblock being coded.

8. The apparatus of claim 3, wherein said colormetric information is in the form of discrete cosine transform (DCT) coefficients.

9. The apparatus of claim 8, wherein said color analyzer comprises:
   a first range comparator, for generating a first output signal indicative of the presence, in said macroblock being coded, of first chrominance DCT coefficients having magnitudes between a first upper threshold level and a first lower threshold level; and
   a second range comparator, for generating a second output signal indicative of the presence, in said macroblock being coded, of second chrominance DCT coefficients having magnitudes between a second upper threshold level and a second lower threshold level; and
   a logical processor, coupled to said first and second comparators, for logically processing said first and second output signals to produce a resultant signal suitable for use by said rate controller.

10. The apparatus of claim 9, wherein said first and second chrominance DCT coefficient threshold levels are selected to produce a resultant signal indicative of the presence of flesh tone colors in said macroblock being coded.

11. The apparatus of claim 4, wherein:
    said rate controller, in response to a buffer fullness signal, adapts the preferential coding of said macroblock being coded to avoid a buffer overflow or buffer underflow condition.

12. In a block-based coding system, a method for preferential coding comprising the steps of:
    analyzing colormetric information associated with a macroblock being coded;
    generating a first signal indicative of the presence of a preferred color or range of colors in said macroblock being coded;
    preferentially increasing, in response to said first output signal, a bit allocation to macroblocks including said preferred color or range of colors.

13. The method of claim 12, further comprising the steps of:
    analyzing luminance information associated with said macroblock being coded;
    generating a second signal indicative of the high frequency luminance content of said macroblock being coded; and
    preferentially increasing, in response to said second output signal, a bit allocation to macroblocks including high frequency luminance content above a threshold level.

14. The method of claim 12, wherein said step of analyzing comprises the steps of:
    generating a third signal indicative of the presence, in said macroblock being coded, of first chrominance components between a first upper threshold level and a first lower threshold level;
    generating a fourth signal indicative of the presence, in said macroblock being coded, of second chrominance components between a second upper threshold level and a second lower threshold level; and
    logically processing said third and fourth signals to produce said first signal.

15. The method of claim 14, wherein said step of logically processing said third and fourth signals comprises the step of performing a logical AND of said third and fourth signals.

16. The method of claim 14, wherein said first and second chrominance component threshold levels are selected such that said resultant first signal is indicative of the presence of flesh tone colors in said macroblock being coded.

17. The method of claim 12, wherein said colormetric information is in the form of discrete cosine transform (DCT) coefficients.

18. The method of claim 17, wherein said step of analyzing comprises the steps of:

generating a fifth signal indicative of the presence, in said macroblock being coded, of first chrominance DCT coefficients having magnitudes between a first upper threshold level and a first lower threshold level; and generating a sixth signal indicative of the presence, in said macroblock being coded, of second chrominance DCT coefficients having magnitudes between a second upper threshold level and a second lower threshold level; and logically processing said fifth and sixth signals to produce said first signal.

19. The method of claim 18, wherein said first and second chrominance DCT coefficient threshold levels are selected such that said resultant first signal is indicative of the presence of flesh tone colors in said macroblock being coded.

20. The method of claim 13, wherein, in response to a buffer fullness signal, said preferential increase of said bit allocation is adapted avoid a buffer overflow or buffer underflow condition.

21. The method of claim 12, wherein said preferred color or range of colors comprises a flesh-tone range of colors.

22. The method of claim 12, wherein said preferred color or range of colors comprises red or blue hues having relatively high saturation levels.

23. The method of claim 12, wherein said colormetric information is processed according to the steps of:

converting, from rectangular coordinate representations to polar coordinate representations, first and second chrominance components;

comparing said converted first chrominance component to a first range having a first upper threshold level and a first lower threshold level; and comparing said converted second chrominance component to a second range having a second upper threshold level and a second lower threshold level.

24. The method of claim 23, wherein said step of analyzing comprises the step of determining if said converted first and second chrominance components are within said respective first and second ranges.

* * * * *